United States Patent
Lin et al.

(10) Patent No.: US 11,807,253 B2
(45) Date of Patent: Nov. 7, 2023

(54) METHOD AND SYSTEM FOR DETECTING DRIVING ANOMALIES

(71) Applicant: National Taiwan University, Taipei (TW)

(72) Inventors: Phone Lin, Taipei (TW); Xin-Xue Lin, Taipei (TW); En-Hau Yeh, Taipei (TW); Chia-Peng Lee, Taipei (TW)

(73) Assignee: National Taiwan University, Taipei (TW)

( * ) Notice: Subject to any disclaimer, the term of this patent is extended or adjusted under 35 U.S.C. 154(b) by 148 days.

(21) Appl. No.: 17/476,061

(22) Filed: Sep. 15, 2021

(65) Prior Publication Data

US 2022/0080988 A1    Mar. 17, 2022

(30) Foreign Application Priority Data

Sep. 17, 2020 (TW) ................. 109132071

(51) Int. Cl.
| | |
|---|---|
| *B60W 50/14* | (2020.01) |
| *B60W 50/02* | (2012.01) |
| *G06N 3/088* | (2023.01) |
| *B60W 60/00* | (2020.01) |
| *G07C 5/00* | (2006.01) |

(52) U.S. Cl.
CPC ........ *B60W 50/0205* (2013.01); *B60W 50/14* (2013.01); *B60W 60/001* (2020.02); *G06N 3/088* (2013.01); *G07C 5/008* (2013.01); *B60W 2050/143* (2013.01); *B60W 2420/42* (2013.01); *B60W 2556/45* (2020.02)

(58) Field of Classification Search
CPC ........... B60W 50/0205; B60W 60/001; B60W 50/14; B60W 2556/45; B60W 2050/143; B60W 2420/42; G06N 3/088; G07C 5/008
See application file for complete search history.

(56) References Cited

U.S. PATENT DOCUMENTS

| | | | |
|---|---|---|---|
| 2013/0226850 A1* | 8/2013 | Hannuksela | ............ G06F 16/58 706/14 |
| 2016/0342903 A1* | 11/2016 | Shumpert | ............. G06F 11/008 |
| 2019/0050515 A1* | 2/2019 | Su | ............. G06N 3/045 |

* cited by examiner

*Primary Examiner* — Aryan E Weisenfeld
*Assistant Examiner* — Jeffrey R Chalhoub
(74) *Attorney, Agent, or Firm* — Chen Yoshimura LLP

(57) ABSTRACT

According to one embodiment of the invention, a method for detecting driving anomalies comprises steps of: with at least one algorithm, processing raw data from On-Board Diagnostics of a car to generate time-series data, with the time series data as input, using an automatic driving behavior separating technology to identify a plurality of driving behaviors; with the driving behaviors as input, using an artificial intelligence technology to build up a driving anomaly detection model without labeling the driving behaviors; and issuing an alarm for driving anomaly identified according to an analyzing result of alarm signature of the driving behaviors.

6 Claims, 4 Drawing Sheets

METHOD AND SYSTEM FOR DETECTING DRIVING ANOMALIES

FIELD OF THE INVENTION

The present invention generally relates to a method and system for detecting driving anomalies; specifically, the method and system for detecting driving anomalies without labeling the driving behaviors and prior domain knowledge of an expert.

BACKGROUND OF THE INVENTION

Referring to FIG. 1, the categorical of detecting methods that solving different problems are shown. The conventional detecting methods for detecting driving anomalies are grouped into the following three categories based on the problem they solve, data anomaly, abnormal activity or behavior; aiming at one single type or several types of sensors; introduced domain knowledge or not. C1: solutions with/without the domain knowledge for handling multiple types of sensors sensing anomaly of an Internet of things (IoT) system, such as time series analysis methods; C2: solutions with the domain knowledge for handling multiple types of sensors sensing anomaly of an IoT system; C3: solutions without the domain knowledge for handling multiple types of sensors sensing anomaly of an IoT system.

Obviously, C1 can be applied to the broadest problem set. However, most conventional detecting methods focus on detecting anomalies of sensor data receiving from a car (subject system) 200, not behaviors of the car 200. Here, the conventional detecting methods for detecting anomalies in the sensor data are grouped into the following three main categories based on the main techniques they rely on: statistical modeling, unsupervised machine learning, and supervised machine learning.

Statistical modeling, such as time-series analysis, can be used to create statistical models of the data, which can then be used to detect abnormal future data samples by verifying whether they follow the models. Such techniques are often used to detect statistical aberrations such as data sample outliers and significant changes in the means of the data samples. These statistical analysis tools require domain knowledge to determine what statistical deviations from the models indicate abnormal data. Today, statistical modeling typically can handle unidimensional data. However, high-dimensional analysis is essential to analyze multiple parameters characterizing the IoT system because independently analyze each parameter often cannot adequately reveal a system's behaviors.

Unsupervised machine learning can be used to cluster data samples. The clustering can then be used to detect whether future data samples are abnormal by verifying whether they fall into any of the clusters. Such unsupervised machine learning techniques do not require domain knowledge and can handle multi-dimensional data. However, they cannot easily take into account the temporal relations between the data samples or detect abnormal behaviors in which each data sample itself in the time series looks normal and hence has limited detection capabilities.

Supervised machine learning can be used to build anomaly detection models. However, prior arts that use supervised machine learning all require domain knowledge to indicate whether each training data sample is normal or abnormal. This means that such technology needs a human expert to identify which training data sample represents normal activity and which training data sample represents abnormal activity.

Recently, prior arts for detecting abnormal activities of an IoT system, as opposed to just abnormal sensor data from the car 200, began to emerge. These prior arts all require domain knowledge about the car 200 and typically rely on manual processes to define or pre-define the normal and abnormal activities performed by the system or identify such activities from the training data sets; and associate each training data sample with its corresponding normal or abnormal activities.

The detection methods that rely on prior domain knowledge can only apply to the types of systems or applications for which they have prior domain knowledge, hence have limited usability. Updates to these detection models will also require domain knowledge and, therefore, can be difficult and costly. Besides, when the system is large or complex, even the human expert cannot extract activity from the training data.

SUMMARY OF THE INVENTION

One aspect of the present invention is to provide a method and system for detecting driving anomalies that use raw data from On-Board Diagnostics of the car, multi-dimensional data sampled at the same time. Steps of pre-processing and using an automatic driving behavior separating technology may be performed. Then, an artificial intelligence (AI) technology may be used to build up a driving anomaly detection model to detect driving behaviors of the car without introducing prior domain knowledge or an expert.

In one aspect of the invention, an embodiment of the invention is provided that a method for detecting driving anomalies comprising: with at least one algorithm, pre-processing raw data from On-Board Diagnostics of a car to form the time-series data; with the time-series data as input, using an automatic driving behavior separating technology to identify a plurality of driving behaviors; with the driving behaviors as input, using an artificial intelligence (AI) technology to build up a driving anomaly detection model to detect driving behaviors of the car without labeling the driving behaviors, and issuing an alarm for driving anomaly identified according to an analyzing result of alarm signatures of the driving behaviors.

In another aspect of the invention, an embodiment of the invention is provided that a system for detecting driving anomalies comprising: a wireless communication module, receiving raw data from On-Board Diagnostics of a car; a storage unit, providing a data storage space; and a processing unit, electrically connecting to the wireless communication module and the storage unit, being configured to: with at least one algorithm, pre-process the raw data to generate time-series data; with the time series data as input, use an automatic driving behavior separating technology to identify a plurality of driving behaviors; with the driving behaviors as input, use an AI technology to build up a driving anomaly detection model to detect driving behaviors of the car without labeling the driving behaviors; and issuing an alarm for driving anomaly identified according to an analyzing result of alarm signatures of the driving behaviors.

DESCRIPTION OF EMBODIMENTS OF THE INVENTION

Figure 1:
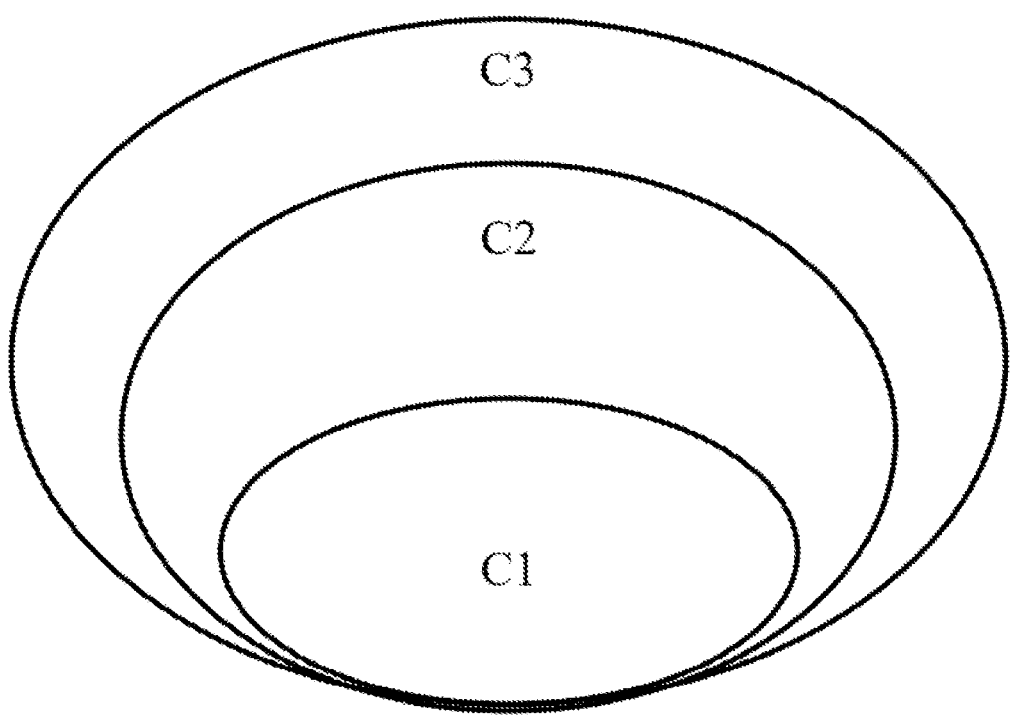
FIG. 1 shows three types of detecting methods for different problems to be solved.

To understand the present disclosure and its advantages, reference is now made to the following description taken in conjunction with the accompanying drawings, in which like reference numbers indicate like features. Persons having ordinary skills in the art will understand other varieties for implementing example embodiments, including those described herein. The drawings are not limited to a specific scale, and similar reference numbers are used for representing similar elements. As used in the disclosures and the appended claims, the terms "embodiment," "example embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in," "on," and the terms "a," "an," and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

A method and system for detecting driving anomalies that use raw data from On-Board Diagnostics of a car are disclosed here. The raw data, multi-dimensional data sampled at the same time, may be pre-processed and processed with an automatic driving behavior separating technology. Then, an artificial intelligence (AI) technology may be used to build up a driving anomaly detection model detecting driving behaviors of the car, and preferably, the driving anomaly detection model may be built up without labeling the driving behaviors, neither introducing prior domain knowledge or an expert. Referring to a systematic block diagram of a system for detecting driving anomalies according to an embodiment of the present invention shown in FIG. 2, a system for detecting driving anomalies 100 may comprise a processing unit 101, a storage unit 102, and a wireless communication module 103. The processing unit 101 electrically connects to the storage unit 102 and the wireless communication module 103 and controls the operation of the storage unit 102 and the wireless communication module 103. The processing unit 101 regularly receives raw data from On-Board Diagnostics (OBD) of a car 200 through the wireless communication module 103. Here, for example, the processing unit 101 may be but not limited to a micro-processor. For example, the storage unit 102 may be but not limited to memory, and the wireless communication module 103 may be but not limited to a Bluetooth wireless communication module. The system for detecting driving anomalies 100 of the present embodiment may be implemented with a fog computing device, such as a Raspberry Pi single-board computer (SBC); however, in some other embodiments, the system for detecting driving anomalies may be implemented with a driving recorder comprising a photographic device electrically connecting to the processing unit, the storage unit further comprising an additional memory card, and the processing unit being configured to control the photographic device to shoot an image in front of the car during the car's driving and then store the image in the memory card.

Figure 2:
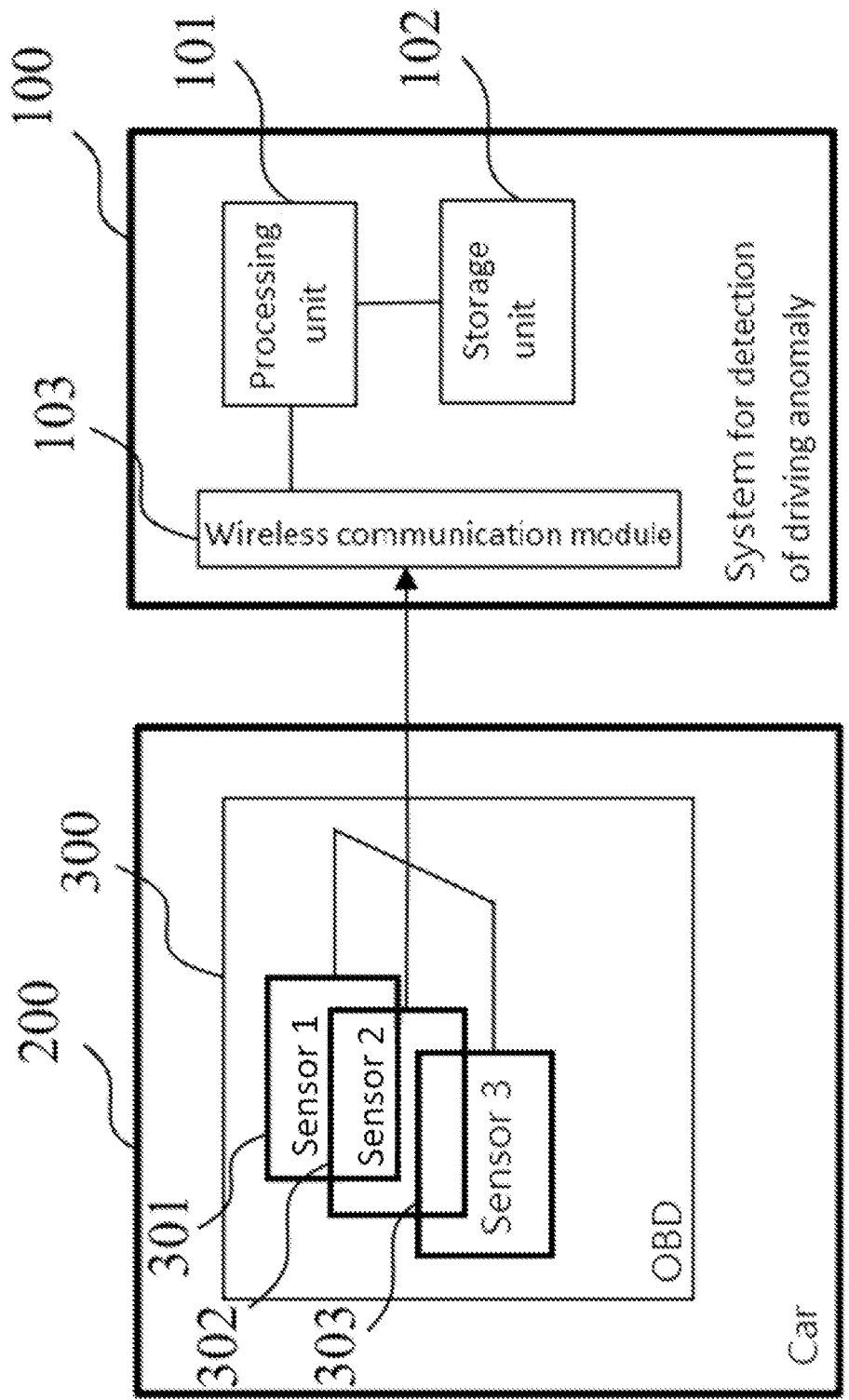
FIG. 2 illustrates a systematic block diagram of a system for detecting driving anomalies according to an embodiment of the present invention.

The car 200 may be any type of car, for example, traditional car, self-driving car, driverless car, or other types of car. The OBD 300 may comply with the OBD-II standard, which is applied for the cars manufactured since 1996, it may generate multi-dimensional raw data according to sensor data from various types of sensors 301, 302, 303. Please note that the number of the sensors 301, 302, 303 may be varied, and FIG. 2 is only for example. The raw data may comprise a combination chosen from data for $CO_2$ (instantaneous), percentage of city driving, percentage of highway driving, percentage of idle driving, the acceleration sensor (x-axis, y-axis, and z-axis), ambient air temperature, engine load (%), engine RPM (rpm), kilometers per liter, accelerator pedal position D, E, turbo boost & vacuum gauge, the fuel flow rate per minute, fuel cost, speed, intake air temperature and horsepower at the wheels.

Figure 3:
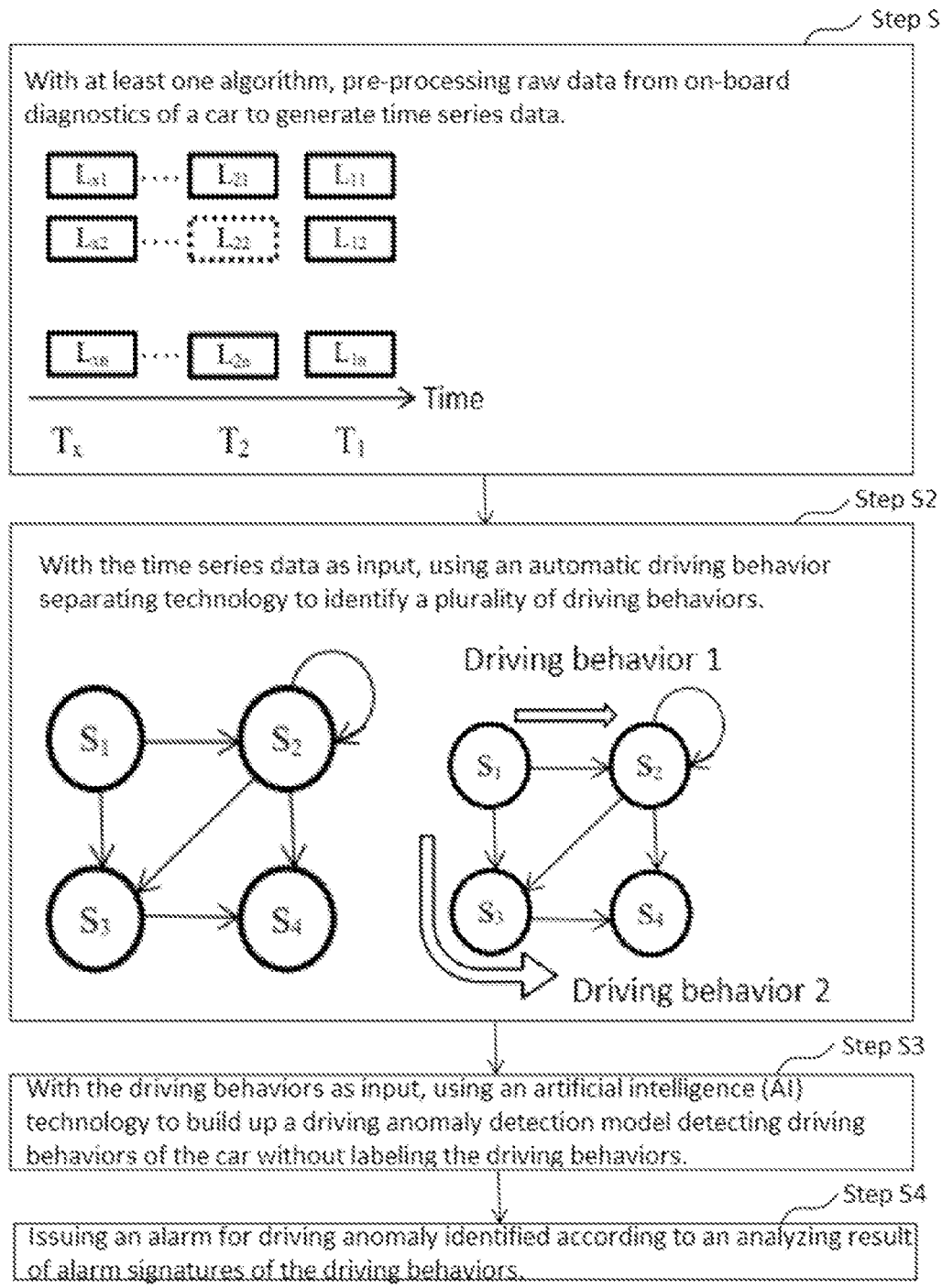
FIG. 3 illustrates a flow chart of a method for detecting driving anomalies according to an embodiment of the present invention.

In the present embodiment, the processing unit 101 is configured to perform a method for detecting driving anomalies shown in FIG. 3, mainly comprising two portions: one is to build up a driving anomaly detection model, and the other one is to issue an alarm for the driving anomaly(s). In the first portion, three steps S1, S2, and S3, may be comprised, for example, and in the second portion, a step S4 may be comprised. In the present embodiment, according to the method for detecting driving anomalies applied to the system for detecting driving anomalies 100, at first, in the step S1, the processing unit 101 of the system for detecting driving anomalies 100 uses at least one algorithm to pre-processing the raw data from the OBD 300 of the car 200 to generate time-series data $L_{11}, L_{12}, \ldots L_{1n}, L_{21}, L_{22}, \ldots L_{2n}, \ldots L_{x1}, L_{x2}, \ldots L_{xn}$. The algorithm may be but not limited to one of Gaussian mixture model algorithm (GMM algorithm), K-means algorithm, and principal component analysis (PCA), and capable to classify, cluster or deduct dimension on the raw data sampled at the same time and then transfer the pre-processed raw data to time series of label value to generate the time series data $L_{11}, L_{12}, \ldots L_{1n}, L_{21}, L_{22}, \ldots L_{2n}, \ldots L_{x1}, L_{x2}, \ldots L_{xn}$ of multi-dimensional time series. The format of the time series data $L_{11}, L_{12}, \ldots L_{1n}, L_{21}, L_{22}, \ldots L_{2n}, \ldots L_{x1}, L_{x2}, \ldots L_{xn}$ of multi-dimensional time series may be CSV (Comma Separated Values) for example, each row of which comprises a field of time and measurement of each monitored parameter measured at the time $T_1, T_2, \ldots T_x$ in the field of time, such as acceleration sensor (X Axis), ambient air temperature, etc., and here it exemplarily comprises but not limited to status $S_1, S_2, S_3, S_4$.

With the time series data $L_{11}, L_{12}, \ldots L_{1n}, L_{21}, L_{22}, \ldots L_{2n}, \ldots L_{x1}, L_{x2}, \ldots L_{xn}$ as input, the processing unit 100 of the system for detecting driving anomalies 100 then performs step S2 to use an automatic driving behavior separating technology to identify a plurality of driving behaviors. Here, the automatic driving behavior separating technology utilizes natural language processing techniques (NLP) to identify the driving behaviors of the car 200. In an example, processing unit 101 may separate the time series data $L_{11}, L_{12}, \ldots L_{1n}, L_{21}, L_{22}, \ldots L_{2n}, \ldots L_{x1}, L_{x2}, \ldots L_{xn}$ with a sliding window into several data slices of a predetermined data volume. The separated data slices of a predetermined data volume may be used as the text of NLP. In another example, 2-gram model, a type of n-gram model of NLP, may be used to scan the text and mark corresponding status, entries, and attributes in the text, which are viewed as letters of NLP, may be mapped into a plurality of status of the driving anomaly detection model, a status transition graph may be generated through NLP to identify the relation between the status and calculate the possibility of status change, and a window size may be changed according to the status transition graph. Status change may comprise a change of status from a status to another status or a series of changes of status, for example, undergone N times of specific changes of status to be another status, and the possibility of status change may be the possibility of occurrence of any activity or behavior. Then, separating with the sliding window and analyzing with NLP are continuously performed until the whole driving behaviors of the car 200 are identified, for example, driving behavior 1 and driving behavior 2 in CSV format, in which each raw records a string of "letter series" corresponding to format of a driving behavior ID to generate an output file. Please note that the driving behavior is not labeled.

Then, in step S3, the processing unit 101 of the system for detecting driving anomalies 100 uses an artificial intelligence (AI) technology to build up a driving anomaly detection model detecting driving behaviors of the car 200 with the driving behaviors as input. Through inputting a certain amount of training data, the accuracy of the driving anomaly detection model may be raised. In the present embodiment, the AI technology may build up the driving anomaly detection model with a status series of the driving behaviors or a word formed by a certain of letters in a series in NLP. Preferably, an alarm generation route for alarming driving anomalies may be built up, for example, issuing an alarm after identifying a driving anomaly due to maloperation during driving, including self-driving, or malfunction of parts. The driving anomaly detection model may output a value of alarm signature representing whether the driving behavior is abnormal or not, such as 1, as abnormal alarm signature representing driving anomaly. The AI technology may comprise one of machine learning algorithm and deep learning algorithm, the machine learning algorithm comprises one of supervised machine learning algorithm and unsupervised machine learning algorithm, and the deep learning algorithm comprises one of convolution neural networks (CNN) and recurrent neural network (RNN).

At this time, the processing unit 101 of the system for detecting driving anomalies 100 may further adjust the alarm generation mechanism and number of alarms for the driving anomaly detection model. For example, a detecting window in the form of one of the sliding windows, fixed window, or any type of detecting window with a predetermined time range. At least one statistic feature of the alarm signatures of the driving behaviors in the detecting window is then calculated, and the alarm is issued when the statistic feature exceeds a predetermined threshold or distributes abnormally in a predetermined time range. In the present embodiment, the statistic feature may be one of the three listed below:

(1) An expectation E is calculated by: (the number of abnormal alarm signatures in the detecting window)/ (the number of the alarm signatures in the detecting window);

(2) A joint Shannon entropy of co-occurrence matrix $$\sum_{i=0}^{1}\sum_{j=0}^{1} P_{i,j} * \log(P_{i,j}),$$

wherein $P_{i,j}=P[X_{t-1}=i, X_t=j]$; and (3) A Kullback-Leibler divergence between the alarm signatures in the detecting window and alarm signatures in training data $$D_{KL}(P\|Q) = \sum_{i} P(i)\log\frac{P(i)}{Q(i)},$$

wherein P and Q are distribution functions of the alarm signatures in the detecting window and the alarm signatures in the training data, respectively.

Figure 4:
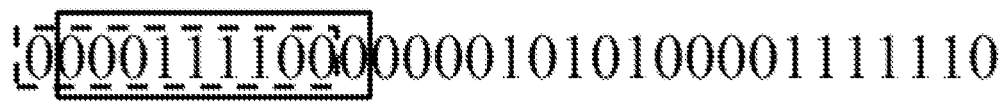
FIG. 4 is a schematic view of a sliding window according to an embodiment of the present invention.
Figure 5:
FIG. 5 is a schematic view of a fixed window according to an embodiment of the present invention.

Referring to the schematic view of a sliding window shown in FIG. 4, there is one alarm signature as spacing between former and current detecting windows for generating the series of the alarm signatures, i.e., the current detecting window, drawn with black line, is one alarm signature behind the former detecting window, drawn with a dotted line. Referring to the schematic view of a fixed window shown in FIG. 5, former and current detecting windows are overlapped. For example, the current detecting window, drawn with the black line, is continuously formed right after the end of the former detecting window, drawn with the dotted line, overlapped. When the detecting window is set with a predetermined time range, the predetermined time range may be 10 minutes or other range to set the size of the detecting window. The size of all of the sliding windows, fixed window or detecting window set with a predetermined time range may be adjusted to meet requirements, such as 30 alarm signatures wide, ten alarm signatures wide, and the predetermined threshold may be varied to meet required sensitivity, such as 0.5, 0.34, and so on, to optimize the number and accuracy of alarms. Preferably, after the adjustment, in the step S4, the processing unit 101 of the system for detecting driving anomalies 100 issues an alarm for driving anomaly identified according to an analyzing result of one of the expectation E, joint Shannon entropy of co-occurrence matrix and Kullback-Leibler divergence between the alarm signatures in the detecting window and alarm signatures in training data. The predetermined threshold may be determined with joint Shannon entropy or Kullback-Leibler divergence of the detecting windows in normal behaviors and may be generated with general outlier detection or anomaly detection algorithm for unidimensional time-series. Here, the outlier detection may be determined by the average and standard deviation of the time series. For example, the predetermined threshold may be "average+n*standard deviation" of the value distribution, and n is usually 2 or 3. Moving Average may be applied too. An alarm may be issued when the current joint Shannon entropy or Kullback-Leibler divergence exceeds the "average+n*standard deviation" of a past period.

The method and system for detecting driving anomalies do not need prior domain knowledge about sensors but a novel technology monitoring driving anomalies of a car in an environment having multiple types of sensors. The method and system for detecting driving anomalies creatively combine NLP and AI technologies to build up a driving anomaly detection model to detect driving behaviors of the car and issuing an alarm for driving anomaly identified.

The method and system for detecting driving anomalies do not need prior domain knowledge about cars and sensors, neither an expert and labeling process. The method and system for detecting driving anomalies may monitor driving anomalies of any type of car, and may be applied to cars of various brands, types, or ages. The system for detecting driving anomalies may be operated separately without affecting the basic operation of the car. Traditional technologies cannot process multi-dimensional raw data and time relation between data samples at the same time, but the method and system for detecting driving anomalies can process the input of multi-dimensional raw data and considering time information to detect anomaly based on the time that cannot be detected by the traditional technologies.

It is to be understood that these embodiments are not meant as limitations of the invention but merely exemplary descriptions of the invention with regard to certain specific embodiments. Indeed, different adaptations may be apparent to those skilled in the art without departing from the scope of the annexed claims. For instance, it is possible to add bus buffers on a specific data bus if necessary. Moreover, it is still possible to have a plurality of bus buffers cascaded in series.

What is claimed is:

1. A method for detecting driving anomalies, applied in a system for detecting driving anomalies comprising a wireless communication module and a micro-processor, the method for detecting driving anomalies, comprising steps of:
   with at least one algorithm, with the micro-processor, pre-processing raw data from On-Board Diagnostics of a car to generate time-series data;
   with the time series data as input, with the micro-processor, using an automatic driving behavior separating technology to identify a plurality of driving behaviors of the car;
   with the driving behaviors as input, with the micro-processor, using an artificial intelligence (AI) technology to build up a driving anomaly detection model to detect driving behaviors of the car without labeling the driving behaviors;
   with the micro-processor, issuing an alarm for driving anomaly identified when at least one statistic feature exceeds a predetermined threshold or distributes abnormally in a predetermined time range according to an analyzing result of alarm signatures of the driving behaviors analyzed with:
      setting a detecting window in the form of one of sliding window and fixed window; and
      calculating the at least one statistic feature of the alarm signatures of the driving behaviors in the detecting window.

2. The method for detecting driving anomalies according to claim 1, wherein the step of pre-processing raw data with at least one algorithm comprises a step of performing classification, clustering, or dimension deduction on the raw data sampled at the same time to generate the time series data.

3. The method for detecting driving anomalies according to claim 1, wherein at least one algorithm comprises one of Gaussian mixture model algorithm (GMM algorithm), K-means algorithm, and principal component analysis (PCA).

4. The method for detecting driving anomalies according to claim 1, wherein the automatic driving behavior separating technology utilizes natural language processing (NLP).

5. The method for detecting driving anomalies according to claim 1, wherein the AI technology comprises one of machine learning algorithm and deep learning algorithm, the machine learning algorithm comprises one of supervised machine learning algorithm and unsupervised machine learning algorithm, and the deep learning algorithm comprises one of convolution neural networks (CNN) and recurrent neural network (RNN).

6. The method for detecting driving anomalies according to claim 1, wherein at least one statistic feature comprises one of:
   An expectation E is calculated by: (the number of abnormal alarm signatures in the detecting window)/(the number of the alarm signatures in the detecting window);
   a joint Shannon entropy of co-occurrence matrix $$\sum_{i=0}^{1}\sum_{j=0}^{1} P_{i,j} * \log(P_{i,j}),$$

wherein $P_{i,j}=P[X_{t-1}=i, X_t=j]$; and
   a Kullback-Leibler divergence between the alarm signatures in the detecting window and alarm signatures in training data $$D_{KL}(P\|Q) = \sum_{i} P(i)\log\frac{P(i)}{Q(i)},$$

wherein P and Q are distribution functions of the alarm signatures in the detecting window and the alarm signatures in the training data, respectively.

* * * * *